United States Patent
Yamashita

(10) Patent No.: US 7,954,909 B2
(45) Date of Patent: Jun. 7, 2011

(54) FLUID PRESSURE BOOSTER

(75) Inventor: Nobuyuki Yamashita, Saitama-Ken (JP)

(73) Assignee: Bosch Corporation, Tokyo (JP)

( * ) Notice: Subject to any disclaimer, the term of this patent is extended or adjusted under 35 U.S.C. 154(b) by 762 days.

(21) Appl. No.: 11/908,162

(22) PCT Filed: Mar. 27, 2006

(86) PCT No.: PCT/JP2006/306986
§ 371 (c)(1),
(2), (4) Date: Sep. 10, 2007

(87) PCT Pub. No.: WO2006/106998
PCT Pub. Date: Oct. 12, 2006

(65) Prior Publication Data
US 2009/0008989 A1    Jan. 8, 2009

(30) Foreign Application Priority Data
Mar. 30, 2005   (JP) .................................. 2005-097798

(51) Int. Cl.
*B60T 8/34* (2006.01)
(52) U.S. Cl. .................................... 303/113.4; 91/369.1
(58) Field of Classification Search ................ 91/376 R, 91/368, 374, 377, 378; 303/114.1–114.3, 303/113.3–113.5
See application file for complete search history.

(56) References Cited

U.S. PATENT DOCUMENTS

| | | | | |
|---|---|---|---|---|
| 4,995,302 A | * | 2/1991 | Suzuki et al. | 91/369.3 |
| 5,355,771 A | | 10/1994 | Watanabe | |
| 5,626,069 A | * | 5/1997 | Uyama | 91/369.3 |
| 5,802,950 A | * | 9/1998 | Lee | 91/376 R |
| 6,269,732 B1 | * | 8/2001 | Ando et al. | 91/376 R |
| 6,318,233 B1 | * | 11/2001 | Takahashi | 91/376 R |
| 6,742,437 B2 | * | 6/2004 | Yamashita | 91/369.1 |
| 2003/0075039 A1 | | 4/2003 | Yamashita | |

FOREIGN PATENT DOCUMENTS

| | | |
|---|---|---|
| DE | 4433518 A1 | 3/1995 |
| DE | 19844233 A1 | 3/2000 |
| EP | 1304273 A2 | 4/2003 |
| JP | 2000-280889 | 10/2000 |
| JP | 2003-127851 | 5/2003 |

* cited by examiner

*Primary Examiner* — Melanie Torres Williams
(74) *Attorney, Agent, or Firm* — Ronald E. Greigg

(57) ABSTRACT

In a fluid pressure booster, when an input shaft and a valve plunger advance, an atmosphere valve opens to introduce air into a variable pressure chamber. At this time, the input shaft has not moved by a predetermined stroke, and thus a projection of the valve plunger is positioned within an inner peripheral surface of a control valve body, thus forming an orifice, which causes air to be sucked at a restricted flow rate. As a result, generation of noise is suppressed. When the input shaft moves the predetermined stroke, the projection of the valve plunger is positioned away from the inner peripheral surface of the control valve body and the orifice is no longer formed. Accordingly, the flow rate of the air is not restricted by the orifice, and thus a relatively large amount of air is sucked into and introduced into the pressure variation chamber.

1 Claim, 5 Drawing Sheets

PRIOR ART

FLUID PRESSURE BOOSTER

CROSS-REFERENCE TO RELATED APPLICATION

This application is a 35 USC 371 application of PCT/JP2006/306986 filed on Mar. 27, 2006.

BACKGROUND OF THE INVENTION

1. Field of Invention

The present invention relates to the technical field of fluid pressure boosters, exemplified for example by a vacuum pressure booster used in a brake booster or the like, that boost an input using a fluid pressure such as vacuum pressure or air pressure, etc. to generate a boosted output. More particularly, the invention relates to the technical field of fluid pressure boosters that suppresses the generation of abnormal noise caused by flow of fluid when operation starts.

2. Description of the Prior Art

In an automobile brake system, in order to allow a large braking force to be obtained using a small pedal depression force, conventionally, fluid pressure boosters of various types have been used that boost the pedal depression force using fluid pressure to generate a large output. One example of this type of fluid pressure booster, namely, a vacuum pressure booster that boosts pedal depression force using vacuum pressure to obtain a large output, is proposed in JP-A-57-107945 (Patent Document 1).

FIG. 4 of the present application shows a cross sectional view of the vacuum pressure booster disclosed in Patent Document 1. In FIG. 4, reference numeral 1 is a vacuum pressure booster, 2 is a front shell, 3 is a rear shell, 4 is a power piston member, 5 is a diaphragm, 6 is a power piston, 7 is a constant pressure chamber that holds pressure at a constant low, vacuum pressure, 8 is a variable pressure chamber into which air, which is a fluid with a high fluid pressure, is introduced during operation from an outside air source that is a high fluid pressure source, 9 is a valve body, 10 is an input shaft, 11 is a valve plunger, 12 is an annular atmosphere valve seat that is a high pressure valve seat and that is provided in the valve plunger 11, 13 is an annular vacuum pressure valve seat that is a low pressure valve seat and that is provided in the valve body 9, 14 is a control valve body that has an annular atmosphere valve 15 that is a high pressure valve, and an annular vacuum pressure valve 16 that is a low pressure valve, the annular atmosphere valve 15 can seat on and separate away from the atmosphere valve seat 12 and the vacuum pressure valve seat 13, 17 is a control valve, 18, 19, 20 are passage holes, 21 is an output shaft, 22 is a return spring that normally urges the power piston 6 to an inoperative position direction, 23 is a reaction disk, 24 is a vacuum pressure introduction pipe, and 25 is an atmosphere introduction port.

When the vacuum pressure booster 1 is in the inoperative state, the control valve body 14 is seated on the atmosphere valve seat 12, and is slightly separated away from the vacuum pressure valve seat 13. Further, an atmosphere valve $V_A$ which is a high pressure valve is closed and a vacuum pressure valve Vv which is low pressure valve is open. In this inoperative state, the variable pressure chamber 8 is cut off from the air, and communicates with the constant pressure chamber 7, whereby vacuum pressure is introduced to the variable pressure chamber 8. Accordingly, the power piston 6 does not move.

When a brake pedal, not shown, is depressed in this inoperative state, the input shaft 10 moves forward (to the left side in FIG. 4), and the valve plunger 11 advances. Accordingly, the vacuum pressure valve 16 seats on the vacuum pressure valve seat 13 and the vacuum pressure valve Vv is closed. Following this, the atmosphere valve seat 12 separates away from the atmosphere valve 15, whereby the atmosphere valve $V_A$ is opened. As a result, the variable pressure chamber 8 is cut off from the constant pressure chamber 7, and communicates with the air. Then, the air is introduced into the variable pressure chamber 8 such that a pressure difference develops between the variable pressure chamber 8 and the constant pressure chamber 7. Accordingly, the power piston 6 advances, and the vacuum pressure booster 1 outputs via the output shaft 21. The output is transmitted to a piston of a brake master cylinder, not shown, whereby the brake master cylinder generates brake pressure.

The reaction force generated by the brake pressure of the brake master cylinder causes the output shaft 21 to abut with the valve plunger 11 via the reaction disk 23, whereby force generated by elastic deformation of the reaction disk 23 is transmitted to the brake pedal via the valve plunger 11 and the input shaft 10 as reaction force.

When an intermediate load state is reached when both the vacuum pressure valve Vv and the atmosphere valve $V_A$ are closed, the output of the vacuum pressure booster 1 is a large output obtained by boosting the pedal depression force by a determined servo ratio. Accordingly, the master cylinder generates a brake pressure that corresponds with this large output, and the brakes operate in accordance with this brake pressure. At this time, the brake force is a large brake force that is obtained by boosting the pedal depression force.

When the brake pedal is released, the input shaft 10 and the valve plunger 11 both retract (move to the right in FIG. 4), thereby opening the vacuum pressure valve Vv while the atmosphere valve $V_A$ is closed. Then, the variable pressure chamber 8 communicates with the constant pressure chamber 7, and air introduced to the variable pressure chamber 8 flows into the constant pressure chamber 7, and is then discharged from the vacuum pressure introduction pipe 24. As a result, the pressure of the variable pressure chamber 8 reduces, and the spring force of the return spring 22 causes the valve body 9, the power piston 6 and the output shaft 21 to retract to the inoperative position. In addition, the control valve 17 is placed in the inoperative state shown in the figure. In other words, the vacuum pressure booster 1 is placed in the inoperative state shown in FIG. 4.

However, in the vacuum pressure booster 1, when the driver performs a brake operation and depresses the brake pedal, and the vacuum pressure booster 1 pushes and moves the piston of the master cylinder, whereby the piston of the master cylinder starts to perform a stroke where there is loss until a determined brake pressure is generated, namely, a loss stroke. In the loss stroke region of the master cylinder, the master cylinder hardly generates any brake pressure at all, or if brake pressure is generated it is comparatively small. Accordingly, even if the output shaft 21 pushes and applies pressure to the reaction disk 23, the elastic deformation amount of the reaction disk 23 is small, and the reaction disk 23 does not abut with the valve plunger 11. As a result, in the loss stroke region of the master cylinder, no reaction force is transmitted to the brake pedal.

In this type of vacuum pressure booster 1, when the brake pedal is depressed rapidly, air is rapidly introduced to the variable pressure chamber 8, as compared to a normal brake operation is performed. However, in the loss stroke region of the master cylinder, because no reaction force is transmitted to the brake pedal, an over stroke of the power piston 6 that is rapidly introduced into the variable pressure chamber 8 occurs. As a result, an over stroke of the valve body 9 also occurs, whereby the vacuum pressure valve Vv opens and the air introduced to the variable pressure chamber 8 escapes to the constant pressure chamber 7 side via the vacuum pressure valve Vv. In addition, when the air escapes from the variable pressure chamber 8, an abnormal noise is generated.

To address this problem, JP-A-2003-127851 (Patent Document 2) proposes a vacuum pressure booster that suppresses the generation on abnormal noise by limiting the quantity of air introduced to the variable pressure chamber 8 by rapid depression of the brake pedal.

FIG. 5 shows a sectional expanded cross sectional view of a section of a control valve of the vacuum pressure booster disclosed in this Publication. Note that structural members that are the same as those in the known vacuum pressure booster shown in FIG. 4 are denoted with the same reference numerals, and a detailed description thereof is omitted.

As can be seen in FIG. 5, in the vacuum pressure booster 1 disclosed in Patent Document 2, the atmosphere valve $V_A$ of the control valve 17 is formed from a first atmosphere valve $V_{A1}$ that allows and blocks communication of the variable pressure chamber 8 and the atmosphere, and a second atmosphere valve $V_{A2}$ that allows and blocks communication of the variable pressure chamber 8 and the atmosphere. In addition, an orifice passage 26 is provided that normally allows communication between the first atmosphere valve $V_{A1}$ and the second atmosphere valve $V_{A2}$ and the atmosphere.

In this structure, the first atmosphere valve $V_{A1}$ of the control valve 17 has an annular first atmosphere valve member 27 that seats on and separates away from the atmosphere valve seat 12. In addition, the second atmosphere valve $V_{A2}$ of the control valve 17 has an annular second atmosphere valve member 28 that is provided to the inside of the first atmosphere valve member 27 and seats on and separates away from the atmosphere valve seat 12.

In addition, when the vacuum pressure booster 1 is inoperative, the first atmosphere valve $V_{A1}$ and the second atmosphere valve $V_{A2}$ are closed, and communication of the atmosphere and the orifice passage 26 and the variable pressure chamber 8 is blocked. Moreover, when the vacuum pressure booster 1 starts to operate, first, with the second atmosphere valve $V_{A2}$ closed, the first atmosphere valve $V_{A1}$ opens to allow communication of the variable pressure chamber 8 and the atmosphere via the orifice passage 26. As a result, air is sucked into and introduced to the variable pressure chamber 8 at a flow rate that is restricted by the orifice passage 26. Following this, the second atmosphere valve $V_{A2}$ opens to allow communication of the variable pressure chamber 8 and the atmosphere via the second atmosphere valve $V_{A2}$ and the first atmosphere valve $V_{A1}$. As a result, the air flow rate restricting function of the orifice passage 26 is no longer effective, and the air flows without its flow rate being restricted, and is sucked into and introduced to the variable pressure chamber 8. In this manner, it is possible to suppress generation of abnormal noise caused by rapid depression of the brake pedal during the initial phase of the brake operation by first restricting the flow rate of the air that is introduced to the variable pressure chamber 8 using the orifice passage 26, and then introducing the air without restricting the flow rate.

However, in the vacuum pressure booster 1 disclosed in Patent Document 2, when the brake pedal is depressed slowly, after the first atmosphere valve $V_{A1}$ has opened, only a small amount of air is taken in before the second atmosphere valve $V_{A2}$ opens. As a result, air that passes through the orifice passage 26 and the gap between the first atmosphere valve member 27 of the first atmosphere valve $V_{A1}$ and the atmosphere valve seat 12 generates flow noise (inflow noise).

In addition, because the flow rate restricting function of the orifice passage 26 is no longer effective, it is necessary to specially provide the first atmosphere valve member 27 in addition to the second atmosphere valve member 28 that is the originally provided atmosphere valve. As a result, the shape of the control valve body 14 is unavoidably complicated. In addition, the first atmosphere valve member 27 and the second atmosphere valve member 28 are provided on a single surface of the control valve 17, and the first and the second atmosphere valves 27, 28 seat on and separate away from the single atmosphere valve seat 12 of the valve plunger 11. Accordingly, it is comparatively difficult to set the timing from after the first atmosphere valve $V_{A1}$ opens to when the second atmosphere valve $V_{A2}$ opens. In addition, because the orifice passage 26 is provided in the control valve body 14 made of flexible material like rubber, there is a possibility that the cross sectional area of the orifice passage 26 will change, thereby causing the air flow rate to change. To avoid this, a reinforcement plate 29 is used to strengthen the section of the control valve body 14 that forms the orifice passage 26. As a result, the shape of the control valve body 14 is more complicated and requires more processing steps, which in turn hinders improvements in ease of manufacturing.

SUMMARY OF THE INVENTION

It is an object of the invention to provide a fluid pressure booster that suppresses the generation of abnormal noise caused when operation starts and that does not hinder improvements in ease of manufacturing, regardless of whether operation is performed suddenly or slowly.

In order to achieve the object of the invention, a fluid pressure booster of the invention includes at the least: a constant pressure chamber into which a constant low fluid pressure is introduced; a variable pressure chamber into which a high fluid pressure, which is higher than the low fluid pressure, is introduced during operation from a high fluid pressure source; a power piston that defines the constant pressure chamber and the variable pressure chamber; a low pressure valve that allows and blocks communication of the constant pressure chamber and the variable pressure chamber; a high pressure valve that performs control to allow or block communication of the variable pressure chamber and the high fluid pressure source; and an input shaft which, when input is applied, performs control to open and close the low pressure valve and the high pressure valve. In this structure, the high pressure valve is opened when the input shaft moves in an operation direction such that the high fluid pressure fluid is introduced to the variable pressure chamber to generate a pressure difference between the variable pressure chamber and the constant pressure chamber that causes the power piston to operate and generate a boosted output, the fluid pressure booster including: flow rate restricting means for restricting a flow rate of the high fluid pressure fluid introduced to the high fluid pressure source side of the high pressure valve, in which the flow rate restricting means exists during the time until the input shaft moves up to a determined stroke and restricts the flow rate of the high fluid pressure fluid, and the flow rate restricting means ceases to exist when the input shaft has moved as far as or beyond the determined stroke and thus does not restrict the flow rate of the high fluid pressure fluid.

In addition, the invention may include: a valve body in which the power piston is provided; a valve plunger that is slidably inserted in the valve body and that is moved by the input shaft; and a control valve body that includes a low pressure valve seat provided in the valve body, a high pressure valve seat provided in the valve plunger, and a low pressure valve member that can seat on the low pressure valve seat and a high pressure valve member that can seat on the high pressure valve seat. In this structure, the low pressure valve is structured from the low pressure valve seat and the low pressure valve member, and the high pressure valve is structured from the high pressure valve seat and the high pressure valve member, and the flow rate restricting means is provided between the valve plunger and the control valve body.

In addition, the invention may be structured such that the flow rate restricting means is an orifice, an annular projection is provided on the valve plunger, and a fluid flow hole for the high fluid pressure fluid is provided in the control valve body. An outer peripheral surface of the projection may face an inner peripheral surface of the fluid flow hole with an annular gap of a determined size therebetween when the input shaft is inoperative. In this structure, the orifice is formed in the gap and exists and restricts the flow rate of the high fluid pressure fluid when the input shaft is inoperative, and when the input shaft moves up to a determined stroke such that the projection separates away from the inner peripheral surface, the orifice ceases to exist.

According to the fluid pressure booster of the invention with the above-described structure, the flow rate restricting means exists during the time until the input shaft moves up to the determined stroke, but ceases to exist when the input shaft has moved as far as the determined stroke or more. Accordingly, it is possible to control the flow rate restriction of the high fluid pressure fluid without providing a special valve like an atmosphere valve that performs control to deactivate the flow rate restricting function of the flow rate restricting means, as in the vacuum pressure booster of Patent Document 2 described above. As a result, regardless of whether operation is performed suddenly or slowly, it is possible to effectively suppress the generation of abnormal noise when operation starts.

In addition, since it is not necessary to provide a special valve as described above, it is possible to suppress generation of abnormal noise when operation starts without having to specially modify the known high pressure valve to give it a complicated shape. Accordingly, the known valve can be used, whereby ease of manufacturing can be improved. In addition, the timing of the shift from restriction of the fluid flow rate by the flow rate restricting means to releasing this flow rate restriction can be controlled easily. In particular, the annular projection is formed on the valve plunger that is easy to process, and the orifice of the flow rate restricting means is formed between the outer peripheral surface of the annular projection and the inner peripheral surface of the fluid flow hole of the control valve body. As a result, ease of manufacturing is improved still further.

BRIEF DESCRIPTION OF THE DRAWINGS

Other features and advantages of the invention will become apparent from the detailed description contained herein below, taken in conjunction with the drawings, in which.

DESCRIPTION OF THE PREFERRED EMBODIMENTS

Figure 1:
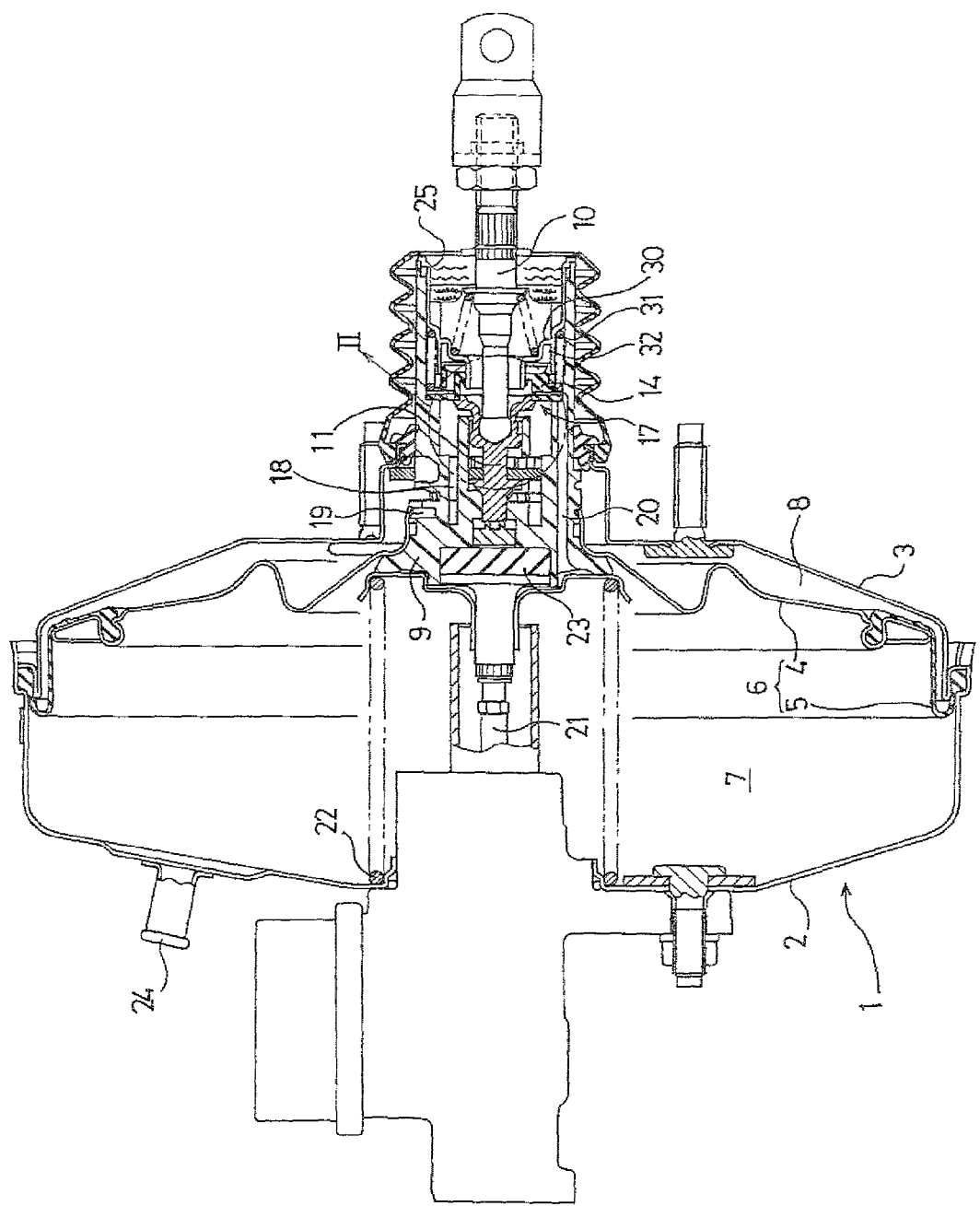
FIG. 1 is a cross sectional view showing a vacuum pressure booster of a brake system that is one applied example of an embodiment of a fluid pressure booster according to the invention.
Figure 2:
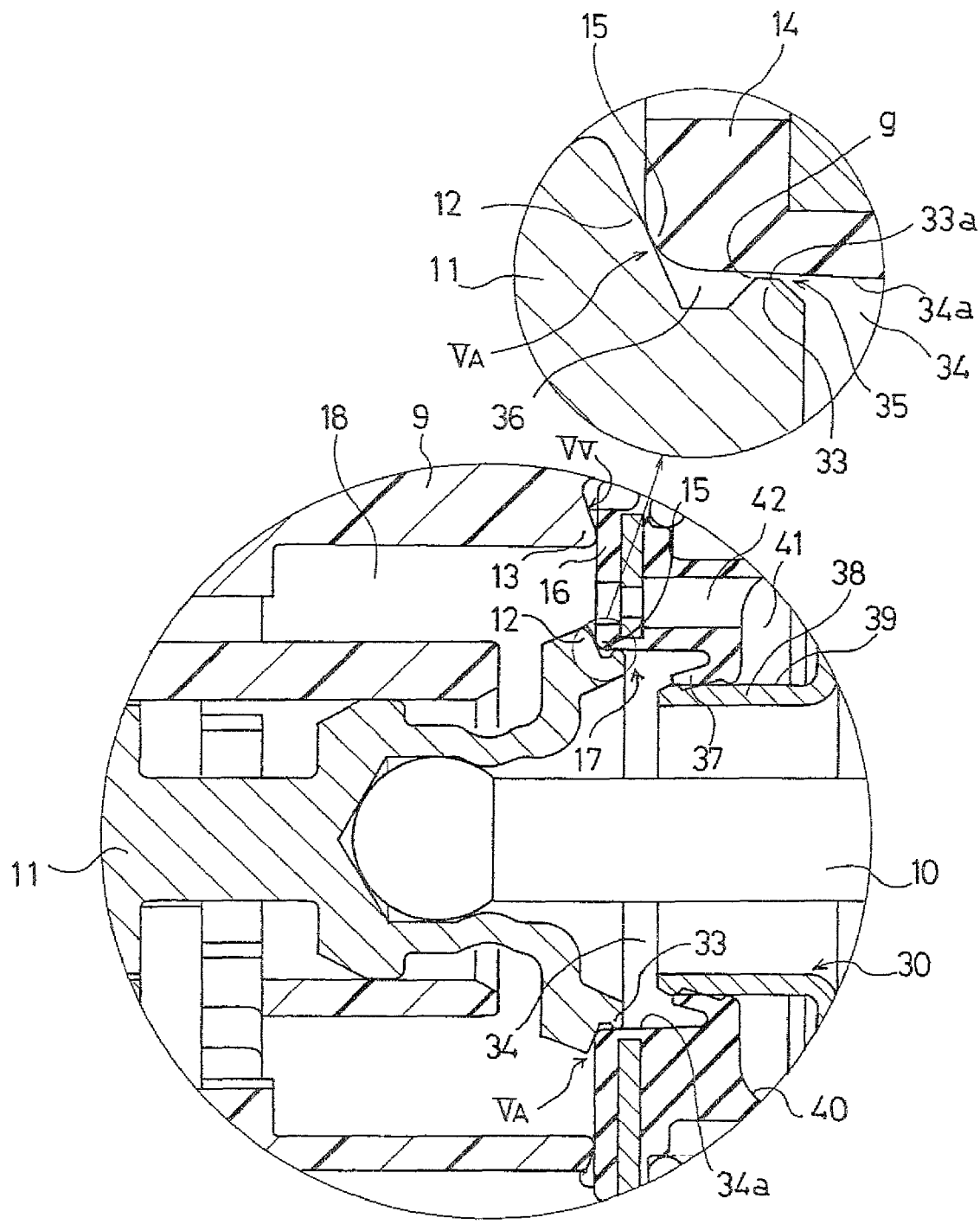
FIG. 2 is an expanded cross sectional view taken along section II shown in FIG. 1.
Figure 4:
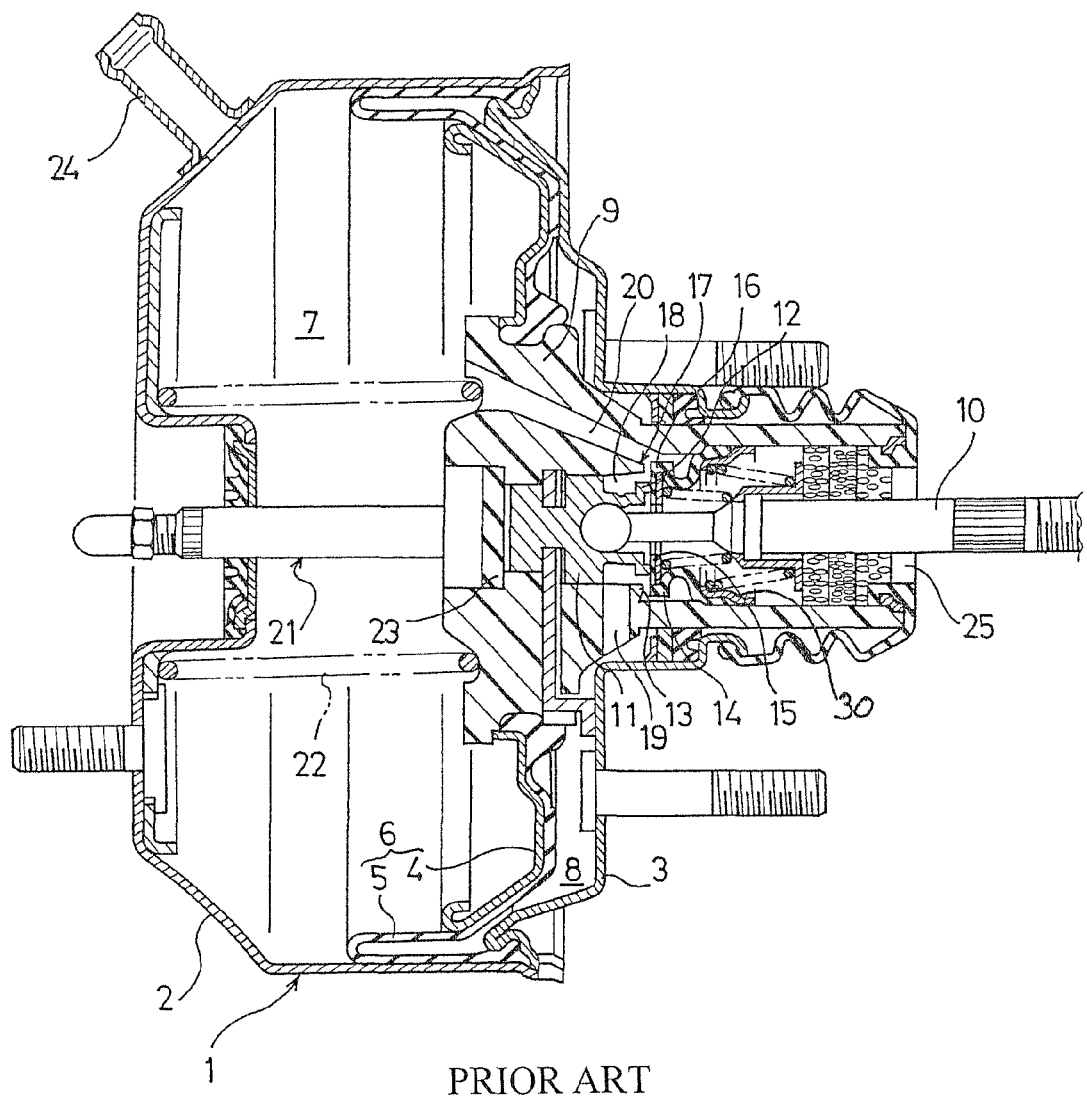
FIG. 4 shows an example of one known vacuum pressure booster.
Figure 5:
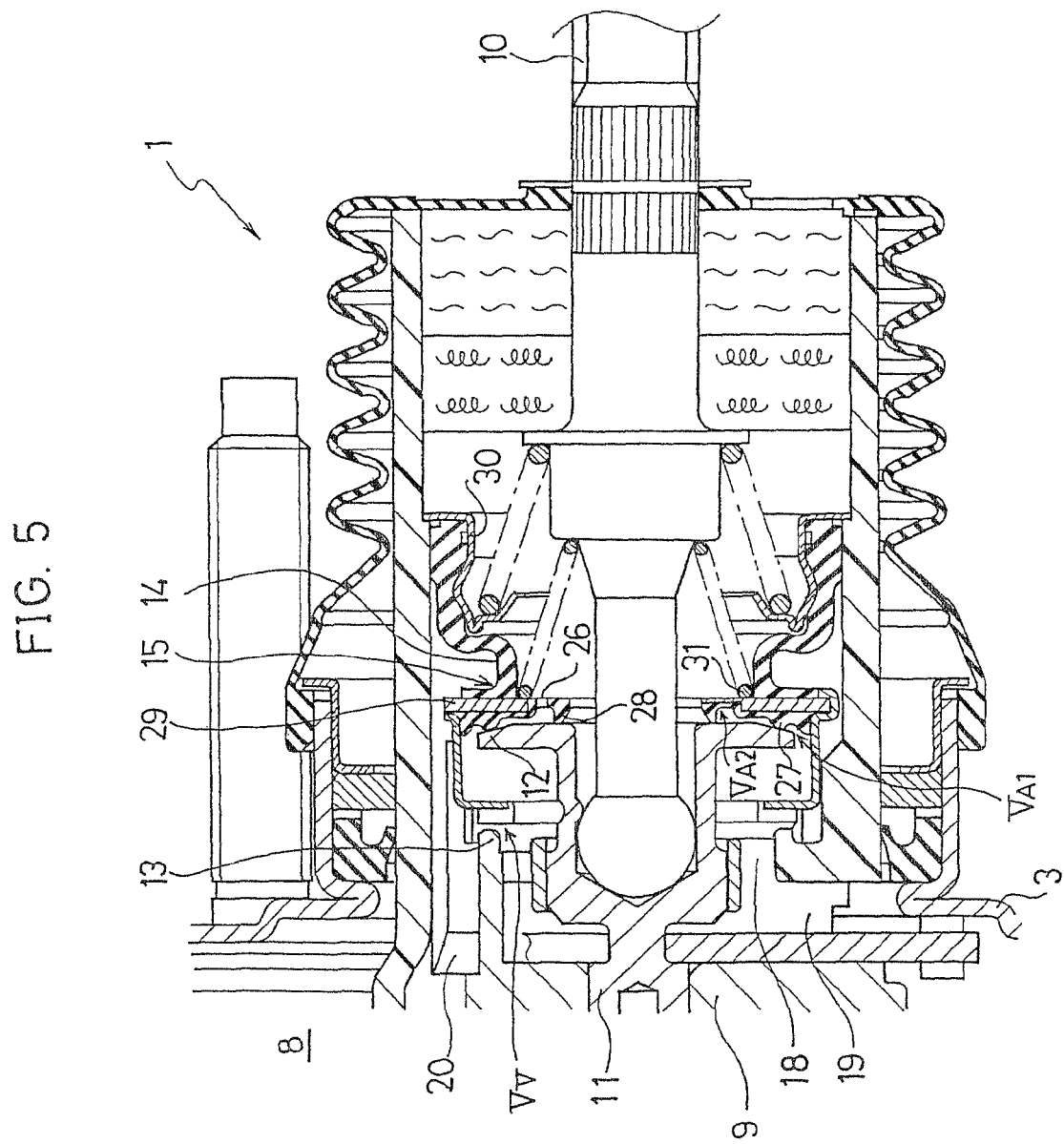
FIG. 5 shows example of another known vacuum pressure booster.

FIG. 1 shows a vacuum pressure booster of a brake system that is one applied example of an embodiment of a fluid pressure booster according to the invention. FIG. 2, which shows the same cross section as FIG. 4, is an expanded cross sectional view showing a section II shown in FIG. 1. Note that structural members that are the same as the known examples of vacuum pressure boosters shown in FIG. 4 and FIG. 5 are denoted with the same reference numerals, and a detailed explanation is omitted here.

In the control valve 17 in the known vacuum pressure booster 1 shown in FIG. 4 and described above, a rear end section of the control valve body 14 is fixed to the valve plunger 11 by a retainer 30, and the atmosphere valve 15 and the vacuum pressure valve 16 of the control valve body 14 are normally urged by a valve spring 31 to the atmosphere valve seat 12 and the vacuum pressure valve seat 13 sides. However, as shown in FIG. 1, in the control valve 17 of the vacuum pressure booster 1 of this example, the rear end section of the control valve body 14 is supported by the inner peripheral surface of a first tube member 32 of the retainer 30 so as to be capable of sliding therealong.

In addition, as can be seen from the expanded FIG. 2, the atmosphere valve 15 is provided in a rounded corner section of the control valve body 14. Further, the annular atmosphere valve seat 12 is formed with a flat topped cone shaped inclining surface such that a front end thereof (the left end in FIG. 2) has a large diameter, and a rear end thereof (the right end in FIG. 2) has a small diameter. In addition, an annular projection 33 is provided on the valve plunger 11 and is adjacent to the rear of the atmosphere valve seat 12. A top of the projection 33 forms an outer peripheral surface 33a of a determined width that extends parallel with the axial direction of the valve plunger 11. Moreover, when the vacuum pressure booster 1 is inoperative, the annular projection 33 is adjacent to the atmosphere valve 15 of the control valve body 14 and protrudes into a flow hole 34 along which air flows. The projection 33 faces an inner peripheral surface 34a of the flow hole 34 with a small gap therebetween. As a result of providing the gap, an annular orifice 35 is formed that functions as flow rate restricting means. In this structure, the inner peripheral surface 34a is formed with a diameter that gradually and continuously increases running from the rear side to the front side (from the right side to the left side in FIG. 2). The inner peripheral surface 34a is formed to have a flat topped cone shape.

As a result of the above structure, when the projection 33 moves relative to the front with respect to the control valve body 14, the opening area of the annular orifice 35 increases gradually. Then, when the projection 33 moves a determined relative distance to the front with respect to the control valve body 14, the projection 33 separates away from the inner peripheral surface 34a, whereby the orifice 35 ceases to exist. As a result, during an initial phase when the valve plunger 11 advances and the atmosphere valve $V_A$ is opened, air is sucked in while its flow rate is restricted by the orifice 35. Then, when the valve plunger 11 advances still further, the restriction created by the orifice 35 gradually reduces, and the air intake amount increases gradually. When the orifice 35 ceases to exist, the restriction created by the orifice 35 ceases to have any effect, and the air intake amount increases.

In this manner, in this example of the vacuum pressure booster 1, the orifice 35 is provided that functions to restrict the flow rate of the high fluid pressure air that is guided to the air source side of the atmosphere valve $V_A$. In addition, while the input shaft 10 moves up to a determined stroke, the orifice 35 functions as described above to restrict the air flow rate. However, once the input shaft 10 has reached or moved beyond the determined stroke, the above-described function ceases to be effective, and the air flow rate is not restricted.

In addition, when the vacuum pressure booster 1 is inoperative, the atmosphere valve 15 seats on the atmosphere valve seat 12 and the atmosphere valve $V_A$ is closed. However, an annular gap 36 is formed between the outer peripheral surface of the valve plunger 11 and the inner peripheral surface 34a of the control valve body 14 and between the position of the atmosphere valve 15 seated on the atmosphere valve seat 12 and the projection 33. Accordingly, the annular gap 36 normally communicates with the atmosphere via the orifice 35.

Note that, as shown in FIG. 1 and FIG. 2, an annular lip 37 is formed on a rear section of the inner peripheral surface 34a of the control valve body 14. The lip 37 abuts against an outer peripheral surface of a second tube member 38 of the retainer 30 that slidably supports the control valve body 14, whereby an annular gap 41 is formed between an outer peripheral surface 39 of the second tube member 38 and an inner peripheral surface 40 of the control valve body 14. In addition, a through hole 42 that extends to the front and rear is formed in the control valve body 14. As a result of providing this through hole 42, the passage 18 positioned to the outer peripheral side of the vacuum pressure valve Vv and the gap 41 normally communicate. In addition, when the pressure on the variable pressure chamber 8 side becomes larger than the air pressure, the lip 37 allows the pressure on the variable pressure chamber 8 side to be released to the atmosphere side via the through hole 42 and the annular gap 41. However, according to the invention, the lip 37, the second tube member 38, the gap 41 and the through hole 42 are not essential structural members, and may be omitted.

Moreover, the control valve 17 is not limited to the control valve 17 shown in FIG. 1 and FIG. 2, and the control valve 17 of the known examples shown in FIG. 4 and FIG. 5 may be used. In this case, it will be readily apparent that, in the control valve 17 shown in FIG. 5, the orifice passage 26 and the second atmosphere valve $V_{A2}$ that includes the second atmosphere valve member 28 are not provided.

The other structural members of this example vacuum pressure booster 1 are the same as those of the above-described example shown in FIG. 4.

Next, the operation of the example vacuum pressure booster 1 with the structure described above will be explained.

When the vacuum pressure booster 1 shown in FIG. 1 and FIG. 2 is in an inoperative state, in a similar manner to the above-described known example of the vacuum pressure booster, the power piston 6, the valve body 9, the input shaft 10, the valve plunger 11, the control valve 17, and the output shaft 21 are at an inoperative position that is at a backward limit shown in the figures. In addition, the reaction disk 23 and the valve plunger 11 are not in contact.

In the example shown in FIG. 2, when the vacuum pressure booster 1 is inoperative, the vacuum pressure valve 16 is seated on the vacuum pressure valve seat 13 and the vacuum pressure valve Vv is placed in a closed position like the atmosphere valve $V_A$. By placing the vacuum pressure valve Vv in the closed position when the vacuum pressure booster 1 is inoperative in this manner, the amount of air that is introduced to the variable pressure chamber 8 is almost an amount that is sufficient to generate a force on the power piston 6 that roughly balances the urging force of the return spring 22. As a result, the atmosphere valve $V_A$ opens soon after when the brake operation is started by depression of the brake pedal, and the above-described amount of air is introduced into the variable pressure chamber 8. Accordingly, the power piston 6 operates quickly, and responsiveness when the brake operation is started is good. Note that the vacuum pressure valve Vv may be placed in a slightly open position when the vacuum pressure booster 1 is inoperative, as shown in the examples of FIG. 4 and FIG. 5.

If the brake pedal is depressed to perform the brake operation when the vacuum pressure booster 1 is inoperative, in a similar manner to the above-described known example, the input shaft 10 and the valve plunger 11 advance, whereby the atmosphere valve $V_A$ is opened such that air is sucked into and introduced to the variable pressure chamber 8. At this time, the input shaft 10 has not yet moved as far as the determined stroke, and the projection 33 of the valve plunger 11 is positioned inside the inner peripheral surface 34a of the control valve body 14 such that the orifice 35 is formed (exists). As a result, the air is sucked in while its flow rate is restricted. Thus, the generation of abnormal noise is suppressed. When the valve plunger 11 advances still further, the restriction of the air flow rate created by the orifice 35 gradually reduces, and the air intake amount gradually increases. Then, when the input shaft 10 and the valve plunger 11 advance still further and the input shaft 10 has moved the determined stroke, the projection 33 of the valve plunger 11 separates away from the inner peripheral surface 34a of the control valve body 14, whereby the orifice 35 ceases to exist. As a result, the orifice 35 ceases to restrict the air flow rate, and a comparatively large amount of air is sucked into and introduced to the variable pressure chamber 8.

As a result, abnormal noise is not generated when air starts to be sucked in due to the brake operation, and after the input shaft 10 and the valve plunger 11 have moved by the determined stroke, the restriction on the air being sucked in is removed. Accordingly, even if the air intake amount is restricted when the brake operation starts, brake responsiveness is good.

The operation of the example of the vacuum pressure booster 1 is similar to that of the vacuum pressure booster 1 of the known example shown in FIG. 4 and described above. Note that the inner peripheral surface 34a of the control valve body 14 may be formed to have a surface that extends parallel with the axial direction of the control valve body 14, rather then being formed to have an inclining surface as in the above description. If this structure is adopted, even if the projection 33 advances relatively with respect to the control valve body 14, the cross sectional area of the orifice 35 is constant while the orifice 35 exists. Accordingly, the restriction of the air flow rate created by the orifice 35 is constant.

According to the example of the vacuum pressure booster 1, unlike the vacuum pressure booster disclosed in the above-described Patent Document 2, the two atmosphere valves $V_{A1}$, $V_{A2}$ of the atmosphere valve $V_A$ are not provided. Instead, the air flow rate is restricted by the orifice 35 and not controlled by an atmosphere valve. As a result, regardless of whether the brake operation is performed suddenly or slowly, it is possible to effectively suppress the generation of abnormal noise when the brake operation starts.

Moreover, there is no need to specially modify the design of the control valve body 14, and it is sufficient to simply provide the annular projection 33 on the valve plunger 11 that is easy to process. Accordingly, as described above, it is possible to suppress generation of abnormal sound when the brake operation starts without having to make the shape of the control valve body 14 complicated and while using the original structure without modification. In addition, the timing of the shift from restriction of the air flow rate by the orifice 35 to releasing this air flow rate restriction can be controlled easily.

Figure 3:
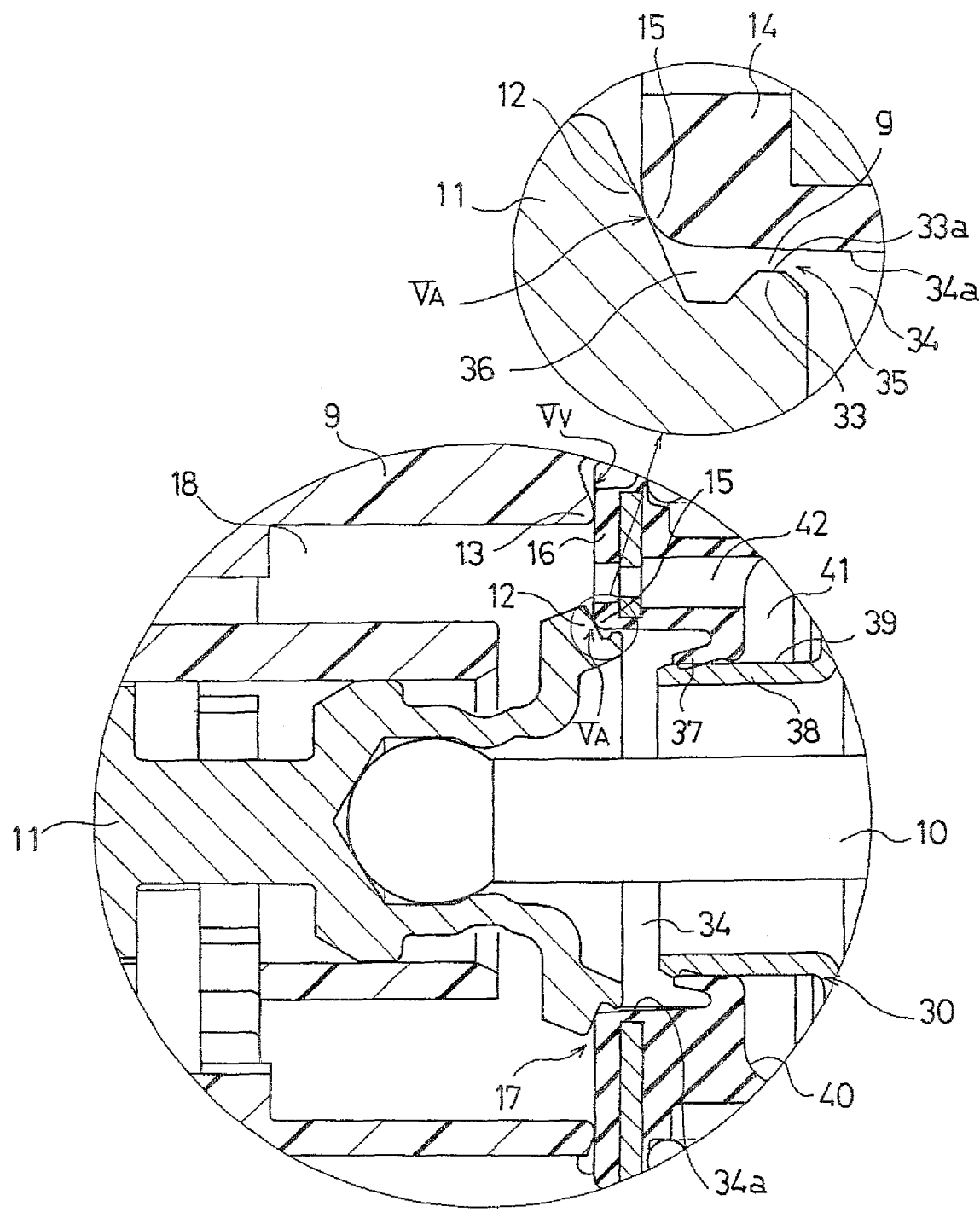
FIG. 3 is an expanded cross sectional view of similar to that shown in FIG. 2 and showing an alternate embodiment of the invention.

FIG. 3 shows another exemplary embodiment of the vacuum pressure booster according to the invention. FIG. 3 is an expanded cross sectional view similar to FIG. 2.

In the example shown in FIG. 2 described above, because a gap g provided between the outer peripheral surface of the annular projection 33 and the inner peripheral surface 34a of the control valve body 14 is extremely small, the flow rate restriction created by the orifice 35 is large. However, in the example of the vacuum pressure booster 1 shown in FIG. 3, the gap g between the outer peripheral surface of the annular projection 33 and the inner peripheral surface 34a of the control valve body 14 is set to be larger than that in the example shown in FIG. 2. As a result, the restriction of the air flow rate created by the orifice 35 is reduced.

According to this example of the vacuum pressure booster 1, the air flow rate is restricted less when the brake operation starts as compared to the example of the vacuum pressure booster 1 shown in FIG. 2. Accordingly, the suppression effect on abnormal noise generation is slightly less, but higher air flow rate can be ensured, whereby responsiveness is improved.

The other structural members of the vacuum pressure booster 1 of this example and the other operational features and effects are the same as those of the example shown in FIG. 4, FIG. 1 and FIG. 2.

Note that, all of the above examples explain the application of the invention to a vacuum pressure booster used in a brake system. However, the invention may be applied to vacuum pressure boosters used in other systems or to a booster used in a booster system that operates using air pressure or the like.

The foregoing relates to a preferred exemplary embodiment of the invention, it being understood that other variants and embodiments thereof are possible within the spirit and scope of the invention, the latter being defined by the appended claims.

The invention claimed is:

1. A fluid pressure booster comprising at least:
a constant pressure chamber into which a constant low fluid pressure is introduced;
a variable pressure chamber into which a high fluid pressure, which is higher than the low fluid pressure, is introduced during operation from a high fluid pressure source;
a power piston that defines the constant pressure chamber and the variable pressure chamber;
a valve body in which the power piston is provided;
a low pressure valve that allows and blocks communication of the constant pressure chamber and the variable pressure chamber;
a high pressure valve that performs control to allow or block communication of the variable pressure chamber and the high fluid pressure source;
an input shaft which, when input is applied, performs control to open and close the low pressure valve and the high pressure valve, wherein the high pressure valve is opened when the input shaft moves in an operation direction such that high fluid pressure fluid is introduced to the variable pressure chamber to generate a pressure difference between the variable pressure chamber and the constant pressure chamber that causes the power piston to operate and generate a boosted output;
flow rate restricting means for restricting a flow rate of the high fluid pressure fluid introduced to the high fluid pressure source side of the high pressure valve and which are provided in the valve body, wherein
the flow rate restricting means exists during the time until the input shaft moves up to a determined stroke and restricts the flow rate of the high fluid pressure fluid, and the flow rate restricting means ceases to exist when the input shaft has moved as far as or beyond the determined stroke and thus does not restrict the flow rate of the high fluid pressure fluid, and wherein
the flow rate restricting means comprises an orifice, an annular projection on the valve plunger, and a fluid flow hole for the high fluid pressure fluid in the control valve body, an outer peripheral surface of the projection facing an inner peripheral surface of the fluid flow hole with an annular gap of a determined size therebetween when the input shaft is inoperative, wherein
the orifice is formed by the gap and exists and restricts the flow rate of the high fluid pressure fluid when the input shaft is inoperative, and when the input shaft moves a determined stroke such that the projection separates away from the inner peripheral surface, the orifice ceases to exist;
a valve plunger that is slidably inserted in the valve body and that is moved by the input shaft; and
a control valve body that includes a low pressure valve seat provided in the valve body, a high pressure valve seat provided in the valve plunger, and a low pressure valve member that can seat on the low pressure valve seat and a high pressure valve member that can seat on the high pressure valve seat, wherein
the low pressure valve is structured from the low pressure valve seat and the low pressure valve member, and the high pressure valve is structured from the high pressure valve seat and the high pressure valve member, and
the flow rate restricting means is provided between the valve plunger and the control valve body.

* * * * *